(12) United States Patent
Goldbaum

(10) Patent No.: US 7,682,120 B1
(45) Date of Patent: Mar. 23, 2010

(54) POSITIVE LOCKING MACHINE SCREW MECHANISM

(76) Inventor: Harold Goldbaum, 22 Pine Arbor La., Apt. 202, Vero Beach, FL (US) 32962

( * ) Notice: Subject to any disclaimer, the term of this patent is extended or adjusted under 35 U.S.C. 154(b) by 0 days.

(21) Appl. No.: 11/515,693

(22) Filed: Sep. 5, 2006

(51) Int. Cl.
*F16B 21/00* (2006.01)
*F16B 35/04* (2006.01)

(52) U.S. Cl. ............... 411/551; 411/418; 411/437; 411/553

(58) Field of Classification Search ........... 411/551, 411/418, 437, 553, 308, 309, 310
See application file for complete search history.

(56) References Cited

U.S. PATENT DOCUMENTS

| | | | | |
|---|---|---|---|---|
| 172,387 | A | * | 1/1876 | Cazin ...................... 411/308 |
| 503,195 | A | | 8/1893 | Clark et al. |
| 827,198 | A | | 7/1906 | Watts |
| 899,080 | A | | 9/1908 | Stark |
| 1,064,546 | A | * | 6/1913 | Ryan ...................... 411/308 |
| 1,250,748 | A | * | 12/1917 | Woodward ............... 411/309 |
| 1,275,478 | A | * | 8/1918 | Ryan ...................... 411/308 |
| 1,451,970 | A | * | 4/1923 | Taylor .................... 411/418 |
| 1,946,860 | A | * | 2/1934 | Kielland .................. 411/308 |
| 2,517,364 | A | * | 8/1950 | Torresen .................. 411/432 |
| 2,521,257 | A | | 9/1950 | Sample |
| 2,828,662 | A | * | 4/1958 | Antal ..................... 411/437 |
| 3,474,846 | A | | 10/1969 | Bien |
| 4,781,507 | A | * | 11/1988 | Duenas ................... 411/433 |
| 5,106,251 | A | * | 4/1992 | Steinbach ................ 411/433 |
| 5,238,342 | A | * | 8/1993 | Stencel ................... 411/43 |
| 5,324,297 | A | * | 6/1994 | Hood et al. .............. 606/99 |
| 5,382,251 | A | * | 1/1995 | Hood et al. .............. 606/99 |
| 5,460,468 | A | * | 10/1995 | DiStacio ................. 411/329 |
| 5,713,708 | A | | 2/1998 | VanderDrift et al. |
| 6,045,188 | A | * | 4/2000 | Schooler ............... 297/362.14 |
| 6,119,306 | A | * | 9/2000 | Antonucci et al. ......... 16/86 A |
| 6,905,297 | B2 | | 6/2005 | DiStasio |
| 6,908,271 | B2 | | 6/2005 | Breslin et al. |
| 7,090,454 | B2 | * | 8/2006 | Shain ..................... 411/431 |

* cited by examiner

*Primary Examiner*—Victor Batson
*Assistant Examiner*—David C Reese
(74) *Attorney, Agent, or Firm*—Allen D. Hertz

(57) ABSTRACT

A positive locking machine screw mechanism comprises a screw having a head and a body wherein the body includes male threads formed thereon wherein the threaded body has at least one longitudinal segment devoid of threads. A work piece defines a hole having female threads formed therein for receiving the screw and further defines in a portion of the hole, at least one longitudinally extending segment devoid of female threads. The longitudinal screw segment devoid of male threads and the longitudinal hole segment devoid of female threads are arranged such that the screw body is longitudinally received in the hole without engagement of the male screw threads with the female work piece threads.

16 Claims, 3 Drawing Sheets

POSITIVE LOCKING MACHINE SCREW MECHANISM

TECHNICAL FIELD

The present invention relates to mechanical fastening systems and more particularly to locking machine screw mechanisms.

BACKGROUND OF THE INVENTION

Threaded fasteners are one of the most common mechanical fastening systems in use today. While bolts and nuts are typically the primary threaded fasteners, screws are just as common and important in the construction of mechanisms consumers use in multitudes of ways every day. A screw is used when, instead of a work piece being clamped between a nut and the head of the fastener, a portion of the work piece is internally threaded and the screw is torqued into the work piece itself. As with all threaded fasteners, screws torqued into engagement with an internally threaded work piece are subject to loosening over time and, as with threaded nuts and bolts, numerous devices have been incorporated to prevent such loosening. In the particular case of eyeglasses, the screws securing the temples and lenses often loosen followed by the undesired consequence of a temple falling off or a lens falling out.

The causes of such loosening in eyewear are varied. The repeated opening and closing of the temples by rotating the temple about the screw retaining it to the frame of the glasses will induce rotational loosening. Thermal gradients in the environment have a more pronounced effect on the female thread in which the screw is received than on the male threaded screw thus resulting in additional loosening forces. In other applications of screws being torqued into a work piece, vibration or dilation will also cause the screw to loosen over time. Often these screws are located in areas that are difficult to access, or may even be totally inaccessible to being retightened.

Prior attempts to overcome these loosening forces have included the addition of a smaller set screw, or locking screw, that is threaded through the side of the work piece into interfering perpendicular contact with the threads of the screw. However, a locking screw is subject to the same loosening forces as the primary screw and can be difficult and expensive to install. Additionally, in the case when the primary screw is relatively small, adding a set screw becomes impractical. Various types of liquid metal on metal glues have been utilized, but over time the effectiveness of these substances is questionable. Lock washers also have mixed success results.

Another problem encountered with machine screws not typically found with regular nuts and bolts is that a machine screw will often engage a greater number of threads in the work piece than in a standard nut of the same size, or in other cases, will require a screw of a significant threaded length necessitating numerous revolutions within the threads to reach a final torqued placement. Mechanical locking systems incorporating deformed threads to interferingly lock the fastener in place become disadvantageous in these circumstances. With long threaded fasteners or numerous internal threads engaged by the fastener, the significant number of turns required to finally torque the fastener will either totally defeat the deformation feature by the time final torqueing is accomplished or the extended sustained torqueing force applied to the fastener head will often damage the head making a final torqueing impossible and requiring an undesired replacement.

Thus, what is desired is a mechanism for quickly positioning and locking screws torqued into a threaded hole in a work piece and wherein the mechanism will reliably maintain the desired engagement of the screw in the receiving hole throughout the life of the apparatus on which it is installed.

SUMMARY OF THE INVENTION

One aspect of the present invention is a positive locking machine screw mechanism. The mechanism comprises a screw having a head and a body wherein the body includes male threads formed thereon and further wherein the threaded body has at least one longitudinal segment devoid of threads. A work piece defines a hole having female threads formed therein for receiving the screw and further defines in a portion of the hole, at least one longitudinally extending segment devoid of female threads. The longitudinal screw segment devoid of male threads and the longitudinal segment in the workpiece devoid of female threads are arranged such that the screw body is longitudinally received in the hole without engagement of the male screw threads with the female work piece threads.

Another aspect of the present invention is a positive locking machine screw mechanism comprising a screw having a head and a body including male threads formed thereon. The threaded body defines a number of circumferentially spaced longitudinally extending body segments therearound. Alternating ones of the body segments are devoid of threads and define thereon a partial outer cylindrical surface. A work piece defines a hole having female threads formed therein for receiving the screw. The threaded hole further defines a like number of longitudinally extending hole segments wherein alternating ones of the hole segments are devoid of threads and define a partial inner cylindrical surface on an inside of the hole. The longitudinal screw body segments devoid of male threads and the longitudinal segments in the work piece hole devoid of female threads are arranged such that the screw body is longitudinally received in the hole without engagement of the male screw threads with the female work piece threads.

These and other advantages of the invention will be further understood and appreciated by those skilled in the art by reference to the following written specification, claims and appended drawings.

DETAILED DESCRIPTION OF THE PREFERRED EMBODIMENT

Figure 1:
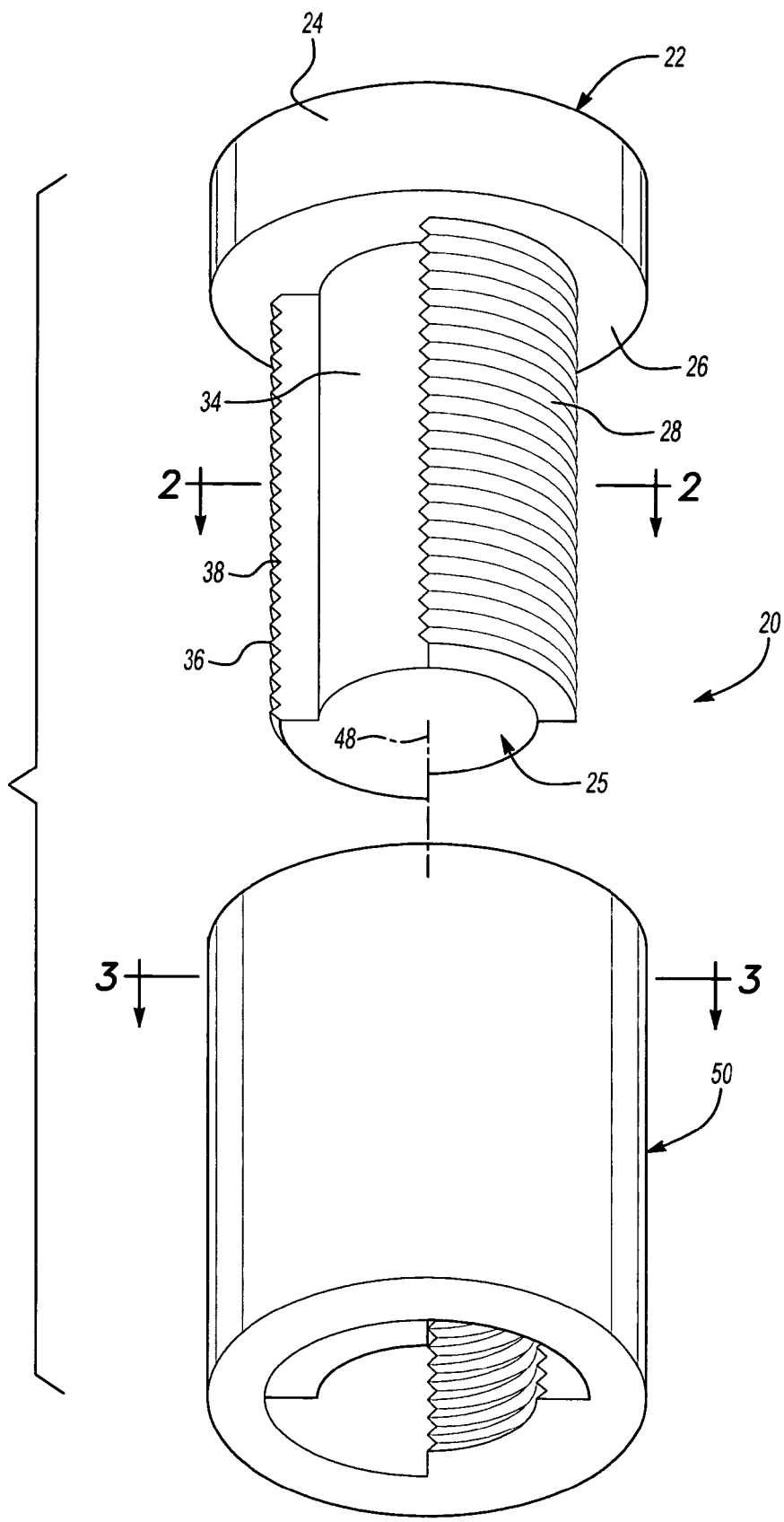
FIG. 1 is an exploded view of a positive locking machine screw mechanism embodying the present invention, illustrated with an internally threaded work piece for receiving a screw.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a positive locking machine screw mechanism 20 which is one of the preferred embodiments of the present invention and illustrates its various components. Locking machine screw mechanism 20 includes a machine screw 22 for threaded engagement in a work piece 50 for the purpose of securing a third article (not shown) to the work piece 50.

Figure 3:
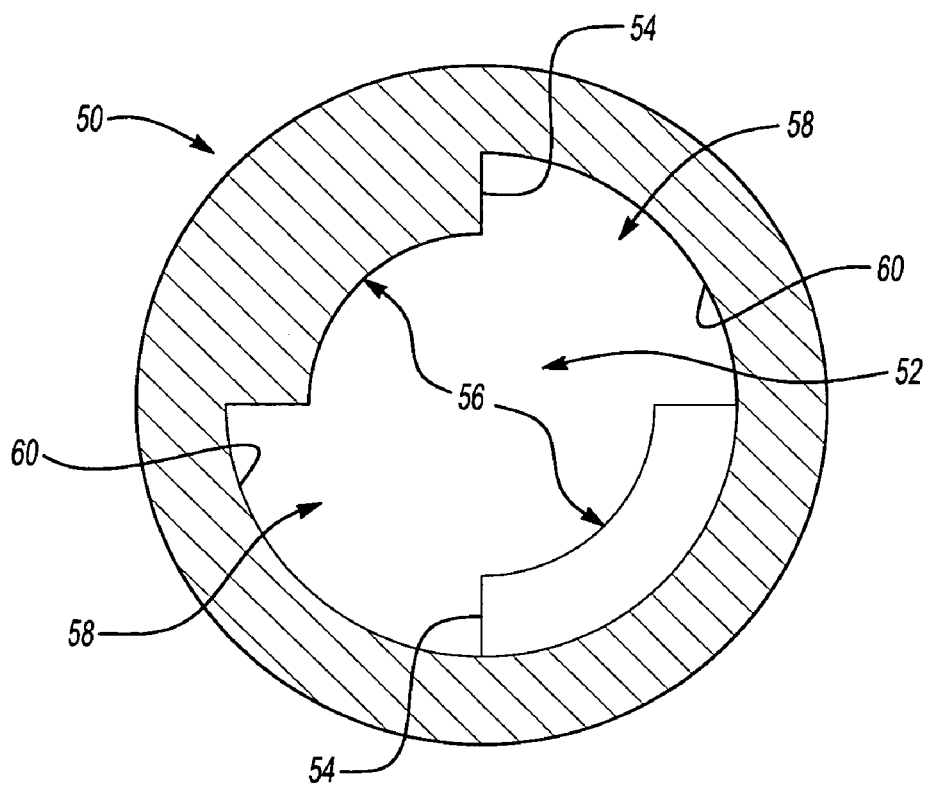
FIG. 3 is plan view of the threaded work piece shown in FIG. 2 and taken along the line 3-3, FIG. 2.

Referring now to FIGS. 1 and 3, machine screw 22 has a head 24 and a body 25 extending from a bottom surface 26 of head 24. Body 25 is divided into a number of longitudinal segments 30, 32 wherein segments 30 include male threads 28 formed thereon and wherein segments 32 are void of threads. Threaded segments 30 are threaded as though male threads 28 extend an entire periphery of screw body 25 such that screw 22 can be threaded into a correspondingly threaded hole without a mismatch of threads from one segment to another. Male threads 28 have a major diameter corresponding to a diameter defined by male thread tops 36 and a minor diameter corresponding to a diameter defined by male thread bottoms 38. Void segments 32 are devoid of threads and have a cylindrically shaped surface 34. Cylindrically shaped surfaces 34 and male threads 28 have a common central axis 48, which is the longitudinal axis of machine screw 22.

While FIGS. 1 and 3 illustrate a machine screw having 2 threaded segments 30 and two void segments 32 extending an entire length of screw body 25, those skilled in the art will readily understand that other numbered combinations of longitudinal segments 30, 32 are possible and are anticipated herein such as three threaded segments 30 and three void segments 32. Further, as is well known in the art, machine screw 22 can also have a body 25 wherein only a lower portion thereof has threads 28 formed thereon. However, that portion of body 25 so threaded will, according to the above description, be divided into threaded segments 30 and void segments 32.

Figure 5:
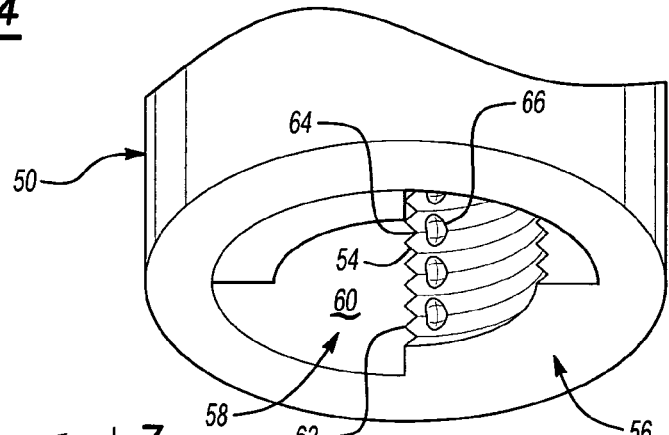
FIG. 5 is a cross-sectional partial elevational view of the threaded work piece of FIG. 1 illustrating an optional locking feature corresponding to FIG. 4, and taken along the line 5-5, FIG. 3.

Turning now to FIGS. 1, 3, and 5, a portion of a general work piece 50 is illustrated defining a hole 52 therein for receiving machine screw 22. Work piece 50 can be a general piece of structure into which machine screw 22 is to be received or a nut to be affixed to machine screw 22 for clamping other pieces therebetween. As with machine screw 22, hole 52 is divided into a number of longitudinal segments 56, 58 wherein segments 56 have female threads 54 formed therein and segments 60 are void of female threads. The number of segments 56, 58 corresponds to a like number of segments 30, 32 on screw body 25. Female threaded segments 56 define female threads 54 formed therein generally corresponding to male threads 28 on screw body 25. Female threads 54 have a minor diameter corresponding to a diameter defined by female thread tops 62 and a major diameter corresponding to a diameter defined by female thread bottoms 64. Void female segments 58 define a cylindrical surface 60 wherein cylindrically shaped surfaces 60 and female threads 54 also have common central axis 48.

Figure 2:
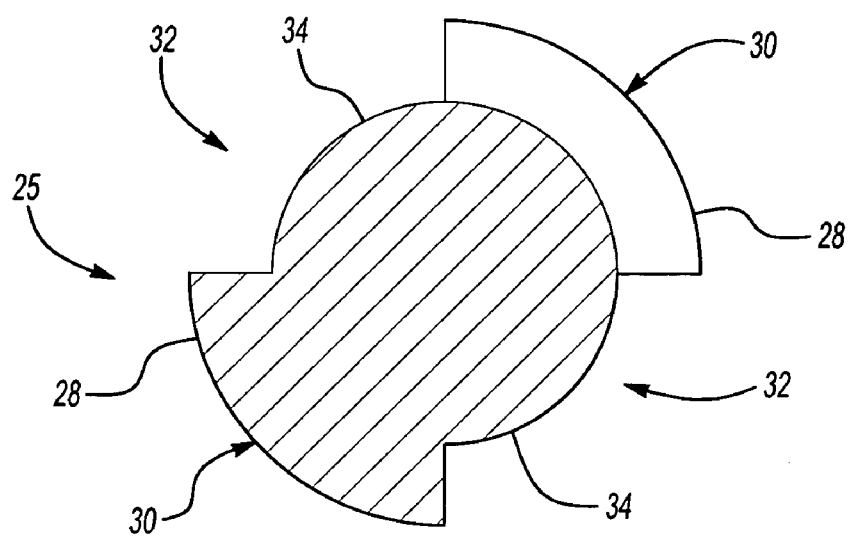
FIG. 2 is a cross-sectional plan view of the screw shown in FIG. 1 and taken along the line 2-2, FIG. 1.

Referring now to FIGS. 1-3, segments 30, 32 of machine screw 22 are shown having a nominal angular width of ninety degrees. Correspondingly, segments 56, 58 in hole 52 also have nominal angular widths of ninety degrees. Initial insertion of machine screw 22 in hole 52 is accomplished by aligning male threaded segments 30 of screw 22 with void female segments 58 defined by hole 52. Machine screw 22 is then translated along axis 48 until screw body 25 is inserted to its desired position within hole 52. To accomplish this insertion in an unobstructed manner, those practiced in the art will recognize that the angular width of void segments 32 and 58 will be formed to have an actual angular width marginally greater than threaded segments 56 and 30 respectively. Further, the diameter of cylindrical surface 60 defined by void segments 58 in hole 52 will be formed marginally greater than the major diameter of male threads 28 as defined by thread tops 36. Similarly, the diameter of cylindrical surface 34 of void segments 32 about screw body 25 will be formed marginally smaller than the minor diameter of female threads 54 as defined by thread tops 62.

While the angular width of male threaded segments 30 are shown in a preferred embodiment to be nominally equal to the angular width of female threaded segments 56, the disclosure herein also contemplates alternative embodiments where male threaded segments 30 and female threaded segments have differing angular widths.

Upon insertion of screw body 25 in hole 52, engagement of machine screw 22 within hole 52 requires torqueing screw 22 only a partial turn with respect to hole 52. The angular rotation required for full engagement of male threads 28 with female threads 54 in the illustrated embodiment is ninety degrees. However, those practiced in the art will recognize that other angular configurations of threaded segments 30 and 56 will require other minimum angular rotations to effect full thread engagement.

Locking of machine screw 22 within hole 52 occurs upon engagement of male threads 28 in female threads 54. The male width of individual male threads 28 of male threaded segments 30 are marginally wider than the female width of female threads 54 thereby creating an interference fit of male threads 28 within female threads 54 of female threaded segments 56. Additionally, the major diameter of male threads 28 as defined by thread tops 36 is marginally greater than the major diameter of female threads 54 as defined by thread bottoms 64. Alternatively, the minor diameter of male threads 28 as defined by thread bottoms 38 can be marginally smaller than the minor diameter of female threads 54 as defined by thread tops 62. The interference fit of male threads 28 within female threads 54 becomes advantageous since screw 22, as a result of its longitudinal insertion capability, does not require multiple rotations to become fully engaged. To facilitate the interference fit of male threads 28 in female threads 54, screw 22 can be manufactured from a material having greater malleability characteristics than work piece 50.

Figure 4:
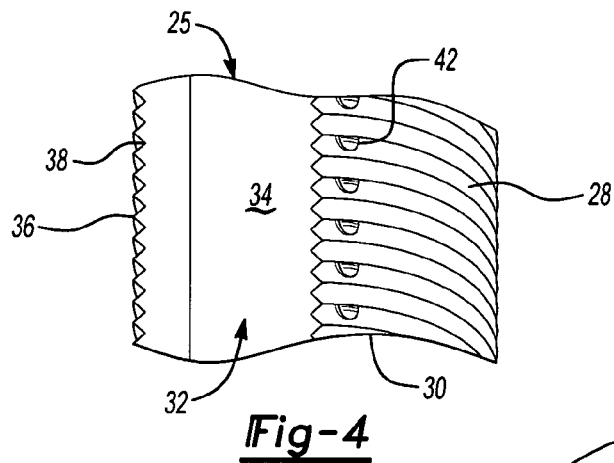
FIG. 4 is an enlarged partial elevational view of the threaded screw shaft showing an optional locking feature.

Referring to FIGS. 4-5, an optional locking feature is illustrated wherein male threaded segments 30 of screw 22 include bosses 40 protruding from individual ones of male threads 28. Individual ones of female threads 54 of female threaded segments 56 in hole 52 define depressions 66 radially placed to correspond to the placement of bosses 40 such that upon full engagement of male threads 28 in female threads 54, bosses 40 are received and seated within depressions 66.

Figure 6:
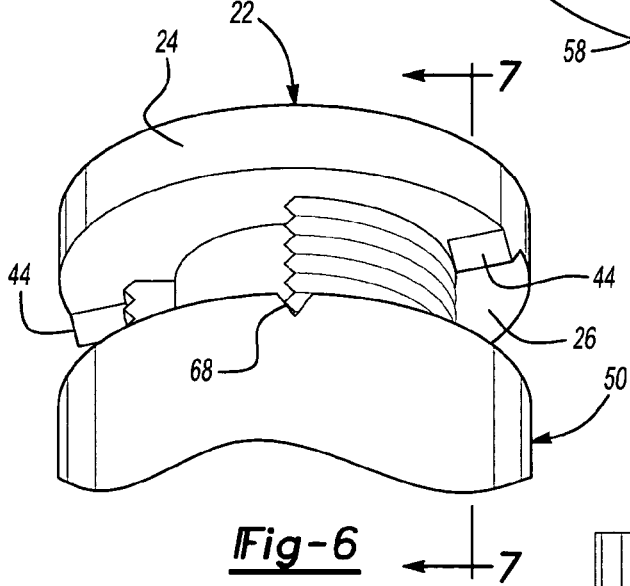
FIG. 6 is an elevational view of the work piece in cross-section and the screw of FIG. 1 incorporating a locking feature on the screw head.
Figure 7:
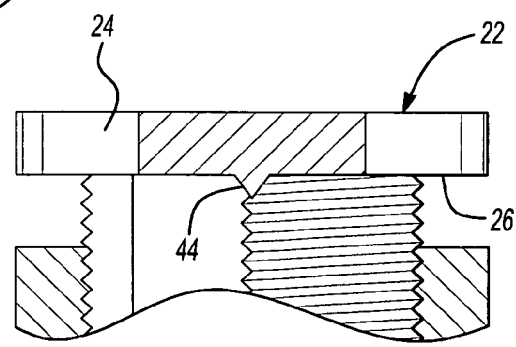
FIG. 7 is a cross-sectional elevation view of the screw and work piece of FIG. 6 taken along the line 7-7.

Turning now to FIGS. 6-7 another optional locking feature is shown. The illustrated locking feature includes a locking bar 44 protruding downwardly from the bottom surface 26 of screw head 24 and extending radially from central axis 48 (FIG. 1). Work piece 50 includes a radial groove proximate to hole 52 and positioned such that upon full engagement of male threads 28 with female threads 54 and as bottom surface 26 bears upon work piece 50, locking bar 44 interferingly bears upon work piece 50 until locking bar 44 is aligned with groove 68. Alignment of locking bar 44 with groove 68 results in the seating of locking bar 44 in groove 68, thus preventing undesired rotation of screw 22 as a result of various environmental factors acting to disengage screw 22 from hole 52. While FIGS. 6-7 illustrate a bar and groove configuration, other geometries of protrusions and recesses are contemplated.

In the foregoing description those skilled in the art will readily appreciate that modifications may be made to the invention without departing from the concepts disclosed herein. Such modifications are to be considered as included in the following claims, unless these claims expressly state otherwise.

I claim:

1. A positive locking machine screw mechanism comprising:
    a screw having a head and a body including male threads formed thereon, said threaded body having at least one longitudinal segment devoid of threads and wherein said male threads generally cover one-half of a total surface of said body;
    a work piece defining a hole having female threads formed on a surface defined therein for receiving said screw, said threaded hole further defining at least one longitudinally extending segment devoid of said female threads and wherein said female threads generally cover one-half of a total of said surface; wherein:
    said longitudinal screw segment devoid of male threads and said longitudinal hole segment devoid of female threads are arranged such that said screw body is longitudinally received in said hole without engagement of said male screw threads with said work piece female threads;
    multiple ones of said male screw threads and multiple ones of said work piece female threads engage one with the other substantially simultaneously upon rotation of said screw with respect to said work piece;
    the screw resulting in maximum engagement of said male screw threads in said work piece female threads via a maximum of one-half of a rotation, and
    a locking feature, wherein said locking feature provides a frictional fit between said male screw threads and female screw threads which securely limits a securing rotation to a maximum of one-half of a rotation and retains said screw in said work piece for both insertion and removal,
    wherein the locking feature is selected from a group consisting of:
      a. a major diameter of said male screw threads being marginally greater than a major diameter of said work piece female threads thereby causing a frictional interference between said male and female threads for securely retaining said screw in said work piece,
      b. a major diameter of male threads as defined by thread tops is marginally greater than the major diameter of female threads as defined by thread bottoms,
      c. a width of individual male threads are marginally wider than the female width of female threads thereby causing a frictional interference fit of male threads within female threads, and
      d. a minor diameter of male threads as defined by thread bottoms can be marginally smaller than the minor diameter of female threads as defined by thread tops.

2. A positive locking machine screw mechanism as recited in claim 1, wherein the threads of the male screw are manufactured from a material having different malleability characteristics than work piece.

3. A positive locking machine screw mechanism as recited in claim 1, wherein the locking feature is provided via the major diameter of said male screw threads being marginally greater than a major diameter of said work piece female threads, thereby causing a frictional interference between said male and female threads for securely retaining said screw in said work piece.

4. A positive locking machine screw mechanism as recited in claim 1, wherein the locking feature is provided via the major diameter of male threads as defined by thread tops is marginally greater than the major diameter of female threads as defined by thread bottoms, thereby causing a frictional interference fit of male threads within female threads.

5. A positive locking machine screw mechanism as recited in claim 1, wherein the locking feature is provided via the width of individual male threads being marginally wider than the female width of female threads, thereby causing a frictional interference fit of male threads within female threads.

6. A positive locking machine screw mechanism as recited in claim 1, wherein the locking feature is provided via the minor diameter of male threads as defined by thread bottoms are marginally smaller than the minor diameter of female threads as defined by thread tops, thereby causing a frictional interference fit of male threads within female threads.

7. A positive locking machine screw mechanism comprising:
    a screw having a head and a body including male threads formed thereon, said threaded body having at least one longitudinal segment devoid of threads and wherein said male threads generally cover one-half of a total surface of said body;
    a work piece defining a hole having female threads formed on a surface defined therein for receiving said screw, said threaded hole further defining at least one longitudinally extending segment devoid of said female threads and wherein said female threads generally cover one-half of a total of said surface; wherein:
    said longitudinal screw segment devoid of male threads and said longitudinal hole segment devoid of female threads are arranged such that said screw body is longitudinally received in said hole without engagement of said male screw threads with said work piece female threads;
    multiple ones of said male screw threads and multiple ones of said work piece female threads engage one with the other substantially simultaneously upon rotation of said screw with respect to said work piece; and
    a width of an individual male thread of said screw is marginally greater than an individual thread of said work piece female threads such that said male screw thread is interferingly received in said work piece female thread thereby causing a frictional interference between said male and female threads for securely retaining said screw in said work piece;
    wherein said interference fit between said male screw threads and work piece female threads limits the rotational relationship between the male screw and the female work piece to less than one-half of a rotation.

8. A positive locking machine screw mechanism as recited in claim 7, wherein the threads of the male screw are manufactured from a material having different malleability characteristics than work piece.

9. A positive locking machine screw mechanism comprising:
- a screw having a head and a body including male threads formed thereon, said threaded body defining a number of circumferentially spaced longitudinally extending body segments there around wherein alternating ones of said body segments are devoid of threads and define thereon a partial outer cylindrical surface and wherein said male threads generally cover one-half of a total surface of said body;
- a work piece defining a hole having female threads formed on a surface defined therein for receiving said screw, said threaded hole further defining a like number of longitudinally extending hole segments wherein alternating ones of said hole segments are devoid of threads and define a partial inner cylindrical surface on an inside of said hole and wherein said female threads generally cover one-half of a total of said surface; wherein:
- said longitudinal screw body segments devoid of male threads and said longitudinal hole segments devoid of female threads are arranged such that said screw body is longitudinally received in said hole without engagement of said male screw threads with said female work piece threads;
- said outer cylindrical surface has a diameter marginally smaller than a minor diameter of said female threads in said work piece hole, and wherein said partial inner cylindrical surface on said inside of said work piece hole has a diameter marginally greater than a major diameter of said male threads of said screw;
- said longitudinal segments of said screw and said work piece hole are of substantially equal angular width;
- said angular width of said screw and work piece hole segments void of threads are marginally greater than said angular width of said threaded segments of said screw and said work piece hole;
- multiple ones of said male screw threads and multiple ones of said work piece female threads engage substantially simultaneously upon rotation of said screw with respect to said work piece; and
- the screw resulting in maximum engagement of said male screw threads in said work piece female threads via a maximum of one-half of a rotation, and
- a locking feature, wherein said locking feature provides a frictional fit between said male screw threads and female screw threads which securely limits a securing rotation to a maximum of one-half of a rotation and retains said screw in said work piece for both insertion and removal, wherein the locking feature is selected from a group consisting of:
  a. a major diameter of said male screw threads being marginally greater than a major diameter of said work piece female threads thereby causing a frictional interference between said male and female threads for securely retaining said screw in said work piece,
  b. a major diameter of male threads as defined by thread tops is marginally greater than the major diameter of female threads as defined by thread bottoms,
  c. a width of individual male threads are marginally wider than the female width of female threads thereby causing a frictional interference fit of male threads within female threads, and
  d. a minor diameter of male threads as defined by thread bottoms can be marginally smaller than the minor diameter of female threads as defined by thread tops.

10. A positive locking machine screw mechanism as recited in claim 9, wherein the threads of the male screw are manufactured from a material having different malleability characteristics than work piece.

11. A positive locking machine screw mechanism as recited in claim 9, wherein the locking feature is provided via the major diameter of said male screw threads being marginally greater than a major diameter of said work piece female threads, thereby causing a frictional interference between said male and female threads for securely retaining said screw in said work piece.

12. A positive locking machine screw mechanism as recited in claim 9, wherein the locking feature is provided via the major diameter of male threads as defined by thread tops is marginally greater than the major diameter of female threads as defined by thread bottoms, thereby causing a frictional interference fit of male threads within female threads.

13. A positive locking machine screw mechanism as recited in claim 9, wherein the locking feature is provided via the width of individual male threads being marginally wider than the female width of female threads, thereby causing a frictional interference fit of male threads within female threads.

14. A positive locking machine screw mechanism as recited in claim 9, wherein the locking feature is provided via the minor diameter of male threads as defined by thread bottoms are marginally smaller than the minor diameter of female threads as defined by thread tops, thereby causing a frictional interference fit of male threads within female threads.

15. A positive locking machine screw mechanism comprising:
- a screw having a head and a body including male threads formed thereon, said threaded body defining a number of circumferentially spaced longitudinally extending body segments there around wherein alternating ones of said body segments are devoid of threads and define thereon a partial outer cylindrical surface and wherein said male threads generally cover one-half of a total surface of said body;
- a work piece defining a hole having female threads formed on a surface defined therein for receiving said screw, said threaded hole further defining a like number of longitudinally extending hole segments wherein alternating ones of said hole segments are devoid of threads and define a partial inner cylindrical surface on an inside of said hole and wherein said female threads generally cover one-half of a total of said surface; wherein:
- said longitudinal screw body segments devoid of male threads and said longitudinal hole segments devoid of female threads are arranged such that said screw body is longitudinally received in said hole without engagement of said male screw threads with said female work piece threads;
- said outer cylindrical surface has a diameter marginally smaller than a minor diameter of said female threads in said work piece hole, and wherein said partial inner cylindrical surface on said inside of said work piece hole has a diameter marginally greater than a major diameter of said male threads of said screw;
- said longitudinal segments of said screw and said work piece hole are of substantially equal angular width;
- said angular width of said screw and work piece hole segments void of threads are marginally greater than said angular width of said threaded segments of said screw and said work piece hole;

multiple ones of said male screw threads and multiple ones of said work piece female threads engage substantially simultaneously upon rotation of said screw with respect to said work piece;

an angular rotation of said screw within said work piece hole substantially equal to said angular width of said longitudinal segments results in maximum engagement of said male screw threads with said female work piece threads, becoming fully engaged in less than one-half of a full rotation of said screw within said work piece; and a width of an individual male thread of said screw is marginally greater than an individual thread of said work piece female threads such that said male screw thread is interferingly received in said work piece female thread thereby causing a frictional interference between said male and female threads for securely retaining said screw in said work piece;

wherein said interference fit between said male screw threads and work piece female threads limits the rotational relationship between the male screw and the female work piece to less than one-half of a rotation.

16. A positive locking machine screw mechanism as recited in claim 15, wherein the threads of the male screw are manufactured from a material having different malleability characteristics than work piece.

\* \* \* \* \*